United States Patent
Oancea et al.

(10) Patent No.: US 12,210,889 B2
(45) Date of Patent: Jan. 28, 2025

(54) AUTOMATION WINDOWS FOR ROBOTIC PROCESS AUTOMATION USING MULTIPLE DESKTOPS

(71) Applicant: UiPath, Inc., New York, NY (US)

(72) Inventors: Radu Oancea, Voineasa (RO); Marius Tirca, Bucharest (RO); Florin Oltean, Bucharest (RO)

(73) Assignee: UiPath, Inc., New York, NY (US)

( * ) Notice: Subject to any disclaimer, the term of this patent is extended or adjusted under 35 U.S.C. 154(b) by 227 days.

(21) Appl. No.: 18/157,130

(22) Filed: Jan. 20, 2023

(65) Prior Publication Data

US 2023/0236855 A1     Jul. 27, 2023

Related U.S. Application Data

(60) Provisional application No. 63/301,934, filed on Jan. 21, 2022, provisional application No. 63/301,679, filed on Jan. 21, 2022.

(51) Int. Cl.
    *G06F 9/54*          (2006.01)
    *G06F 9/451*       (2018.01)

(52) U.S. Cl.
    CPC .............. *G06F 9/452* (2018.02); *G06F 9/547* (2013.01)

(58) Field of Classification Search
    None
    See application file for complete search history.

(56) References Cited

U.S. PATENT DOCUMENTS

| | | | |
|---|---|---|---|
| 7,013,465 B1 | 3/2006 | Taylor et al. | |
| 7,080,385 B1 | 7/2006 | Collison et al. | |
| 7,478,402 B2 | 1/2009 | Christensen et al. | |
| 7,899,915 B2 | 3/2011 | Reisman | |
| 8,402,431 B2 | 3/2013 | DeBoer et al. | |

(Continued)

FOREIGN PATENT DOCUMENTS

| | | |
|---|---|---|
| CN | 102473106 B | 4/2015 |
| CN | 105934723 A | 9/2016 |

(Continued)

OTHER PUBLICATIONS

Notice of Allowance issued in Korean Application No. 10-2020-0101943 on Dec. 23, 2020.

(Continued)

*Primary Examiner* — Rinna Yi
(74) *Attorney, Agent, or Firm* — LeonardPatel PC; Michael A. Leonard, II; Sheetal S. Patel

(57) ABSTRACT

Automation windows for robotic process automation (RPA) using multiple desktops are disclosed. One or more robot desktops are launched, and one or more RPA robots operate in the robot desktop(s). The robot desktops may not initially be the active desktop. When the robot(s) execute their automations, if an activity in the RPA robot workflow needs the robot desktop to be the active desktop, the active desktop is switched to the appropriate robot desktop when the appropriate robot desktop is not already active, and activit (ies) of the RPA workflow that require the robot desktop to be the active desktop are executed. In some embodiments, after RPA workflow execution finishes, the robot desktop, the RPA robot, or both, are automatically closed.

16 Claims, 8 Drawing Sheets

(56) References Cited

U.S. PATENT DOCUMENTS

| | | |
|---|---|---|
| 9,552,056 B1 | 1/2017 | Barry et al. |
| 10,324,457 B2 | 6/2019 | Neelakandan et al. |
| 10,339,027 B2 | 7/2019 | Garcia et al. |
| 10,503,627 B2 | 12/2019 | Radhakrishnan et al. |
| 10,572,316 B2 | 2/2020 | Carteri et al. |
| 10,630,780 B1 | 4/2020 | Levithan |
| 10,654,166 B1 | 5/2020 | Hall |
| 10,802,889 B1 | 10/2020 | Ganesan et al. |
| 10,860,905 B1 | 12/2020 | Gligan et al. |
| 10,911,546 B1 | 2/2021 | Goswami et al. |
| 11,117,259 B2 | 9/2021 | Hall |
| 11,130,233 B2 | 9/2021 | Hall |
| 11,157,339 B1 | 10/2021 | Dines |
| 11,171,989 B1 | 11/2021 | Kim |
| 11,233,861 B2 | 1/2022 | Hall et al. |
| 11,307,876 B1 | 4/2022 | Leonard et al. |
| 11,325,254 B2 | 5/2022 | Hall |
| 11,366,644 B1 | 6/2022 | Krebs et al. |
| 11,392,477 B2 | 7/2022 | Dines |
| 2002/0105296 A1 | 8/2002 | Okuyama et al. |
| 2003/0191559 A1 | 10/2003 | Chatsinchai et al. |
| 2004/0015266 A1 | 1/2004 | Skoog |
| 2005/0262052 A1 | 11/2005 | Daniels et al. |
| 2006/0184293 A1 | 8/2006 | Konandreas et al. |
| 2009/0064177 A1 | 3/2009 | Bauer et al. |
| 2010/0076600 A1 | 3/2010 | Cross et al. |
| 2012/0324359 A1 | 12/2012 | Lee et al. |
| 2012/0331404 A1 | 12/2012 | Buford et al. |
| 2013/0297678 A1 | 11/2013 | Schach et al. |
| 2015/0363224 A1 | 12/2015 | Argenti et al. |
| 2016/0259651 A1 | 9/2016 | Nychis et al. |
| 2016/0259655 A1 | 9/2016 | Nychis et al. |
| 2016/0288322 A1 | 10/2016 | Lin et al. |
| 2017/0052824 A1 | 2/2017 | Sharma et al. |
| 2017/0076194 A1 | 3/2017 | Versace et al. |
| 2017/0295243 A1 | 10/2017 | Kim |
| 2018/0041591 A1 | 2/2018 | Yoden |
| 2018/0074636 A1 | 3/2018 | Lee et al. |
| 2018/0074931 A1 | 3/2018 | Garcia et al. |
| 2018/0121217 A1 | 5/2018 | Jarabek et al. |
| 2018/0189093 A1 | 7/2018 | Agarwal et al. |
| 2018/0197123 A1 | 7/2018 | Parimelazhagan et al. |
| 2018/0370033 A1 | 12/2018 | Geffen et al. |
| 2019/0004932 A1 | 1/2019 | Misra et al. |
| 2019/0022856 A1 | 1/2019 | Kulläng |
| 2019/0066018 A1 | 2/2019 | Sethi et al. |
| 2019/0122200 A1 | 4/2019 | Kurian |
| 2019/0129824 A1 | 5/2019 | Radhakrishnan et al. |
| 2019/0130094 A1 | 5/2019 | Votaw et al. |
| 2019/0132229 A1 | 5/2019 | McCormack et al. |
| 2019/0138600 A1 | 5/2019 | Krishnan et al. |
| 2019/0155225 A1 | 5/2019 | Kothandaraman et al. |
| 2019/0171845 A1 | 6/2019 | Dotan-Cohen et al. |
| 2019/0215283 A1 | 7/2019 | Nahum et al. |
| 2019/0303779 A1 | 10/2019 | Briggle et al. |
| 2020/0001471 A1 | 1/2020 | Chen et al. |
| 2020/0004798 A1 | 1/2020 | Weinert, Jr. et al. |
| 2020/0019283 A1 | 1/2020 | Nychis et al. |
| 2020/0147791 A1 | 5/2020 | Safary et al. |
| 2020/0169933 A1 | 5/2020 | Gay et al. |
| 2020/0180155 A1 | 6/2020 | Hall |
| 2020/0213422 A1 | 7/2020 | Pandya et al. |
| 2020/0233707 A1 | 7/2020 | Ramamurthy et al. |
| 2020/0246978 A1 | 8/2020 | Johnson et al. |
| 2020/0348654 A1 | 11/2020 | Anand et al. |
| 2020/0348960 A1 | 11/2020 | Krishnamurthy et al. |
| 2020/0348964 A1 | 11/2020 | Anand et al. |
| 2020/0356395 A1 | 11/2020 | Deng et al. |
| 2020/0371818 A1* | 11/2020 | Banne .................... G06F 40/20 |
| 2021/0042338 A1 | 2/2021 | Smutko et al. |
| 2021/0086354 A1 | 3/2021 | Berg et al. |
| 2021/0109717 A1 | 4/2021 | Voicu et al. |
| 2021/0110035 A1 | 4/2021 | Seth |
| 2021/0122032 A1 | 4/2021 | Davis et al. |
| 2021/0125025 A1 | 4/2021 | Kuo et al. |
| 2021/0129325 A1 | 5/2021 | Yu et al. |
| 2021/0146537 A1 | 5/2021 | Bannoura |
| 2021/0252703 A1 | 8/2021 | Hall |
| 2021/0258389 A1 | 8/2021 | Hall et al. |
| 2021/0342216 A1* | 11/2021 | Dines .................. G06F 11/0793 |
| 2021/0357236 A1 | 11/2021 | Cohen et al. |
| 2022/0011732 A1 | 1/2022 | Hall |
| 2022/0012152 A1 | 1/2022 | Dines |
| 2022/0019195 A1 | 1/2022 | Yu et al. |
| 2022/0070246 A1 | 3/2022 | Ripa |
| 2023/0033945 A1 | 2/2023 | Xue et al. |
| 2023/0142070 A1* | 5/2023 | Ranganaboina ........ G06F 3/147 |
| | | 715/778 |
| 2023/0169399 A1* | 6/2023 | Cali ....................... G06N 20/00 |
| | | 706/12 |

FOREIGN PATENT DOCUMENTS

| | | |
|---|---|---|
| CN | 107666987 A | 2/2018 |
| CN | 107682368 A | 2/2018 |
| CN | 109074402 A | 12/2018 |
| CN | 109118347 A | 1/2019 |
| CN | 109636504 A | 4/2019 |
| CN | 201910345536 A | 7/2019 |
| CN | 110286998 A | 9/2019 |
| CN | 110648054 A | 1/2020 |
| JP | 2006000954 A | 1/2006 |
| JP | 5607741 B2 | 10/2014 |
| JP | 2018535459 A | 11/2018 |
| JP | 6532626 B1 | 6/2019 |
| JP | 2019159556 A | 9/2019 |
| JP | 2019169044 A | 10/2019 |
| JP | 2020003905 A | 1/2020 |
| JP | 202000017099 | 1/2020 |
| JP | 2020092400 A | 6/2020 |
| KR | 1020180123513 A | 11/2018 |
| TW | 201608395 A | 3/2016 |
| WO | 2017176917 A1 | 10/2017 |
| WO | 2021167644 A1 | 8/2021 |

OTHER PUBLICATIONS

Notice of Allowance issued in Korean Application No. 10-2020-7028190 on Aug. 27, 2022.

Notice of Allowance issued in Korean Application No. 10-2020-7028231 on Nov. 4, 2022.

Notice of Allowance issued in Taiwanese Application No. 109124314 on May 4, 2021.

Notice of Allowance issued in Taiwanese Patent Application No. 109133853 on Apr. 27, 2022.

Notification of Reasons for Refusal issued in Japanese Application No. 2020-553457 on Nov. 4, 2022.

Notification of Reasons for Refusal issued in Japanese Patent Application No. 2020-125401 on Dec. 15, 2020.

Office Action issued in Chinese Application No. 202010894023.7 on Feb. 8, 2022.

Office Action received in European Application No. 20197271.8 on Jun. 10, 2022.

Official Letter and Search Report issued by the Taiwan Intellectual Property Office (TIPO) on Jan. 29, 2021.

Pall Jensson, "Robotic Process Automation: Dynamic Roadmap for Successful Implementation" (2018).

PWC Robotic Process Automation in a Virtual Environment brochure available at https://www.pwc.in/assets/pdfs/publications/2018/robotic-process-automation-in-a-virtual-environment.pdf (May 2018).

Quang-Vinh Dang, Scheduling a single mobile robot for part-feeding tasks of production lines. (Year: 2014).

Radoslaw Dukalski, Portable rapid visual workflow simulation tool for human robot coproduction. (Year: 2017).

Remote Desktop ActiveX Control Classes Page available at https://docs.microsoft.com/en-us/windows/win32/termserv/remote-desktop-activex-control-classes (last accessed Jan. 20, 2022).

Remote Desktop ActiveX Control Classes page available at https://docs.microsoft.com/en-us/windows/win32/termserv/remote-desktop-activex-control-classes (last accessed Jan. 21, 2022).

(56) References Cited

OTHER PUBLICATIONS

Search Report issued in Chinese Application No. 202010894023.7 on Feb. 8, 2022.
Shinichi Hoshi, "Let's Warp, OS / 2 Programming 3rd Multitasking System's Interprocess Communication," DDJ (Dr. Dobb's Journal Japan), Shoeisha Co., Ltd., pp. 170-176 (Jul. 1, 1995).
Solomiya Yatskiv, Improved Method of Software Automation Testing Based on the Robotic Process Automation Technology. (Year: 2019).
Sumi Takano, "How to create a parallel program in OS / 2 (I)," Information Processing, vol. 31, No. 10, Information Processing Society of Japan, pp. 1425-1432, ISS: 0447-8053 (Oct. 15, 1990).
Supplementary European Search Report issued for EP Application No. 20197271.8 on Feb. 26, 2021.
JiPath Extension for Windows Remote Desktop page available at https://docs.uipath.com/studio/docs/extension-for-windows-remote-desktop (last accessed Feb. 14, 2020).
UiPath Robot Agent documentation available at https://docs.uipath.com/robot/docs/robot-agent (last accessed Feb. 14, 2020).
Windows Remote Desktop Services roles page available at https://docs.microsoft.com/en-us/windows-server/remote/remote-desktop-services/rds-roles (last accessed Jan. 20, 2022).
Examination Report, issued May 31, 2024, European Patent Application No. 20199147.8.
Lechi Truong, "Non-Final Office Action", issued Mar. 16, 2023, U.S. Appl. No. 17/583,044.
Notification of Reasons for Refusal issued in Japanese Application No. 2020-553457 on Apr. 10, 2023.
Reddy, et al., "A Study of Robotic Process Automation Among Artificial Intelligence", International Journal of Scientific and Research Publications, vol. 9, Issue 2, Feb. 2019.
Second Office Action issued in Chinese Application No. 202080002309.8 on Jan. 20, 2023.
Abdou K Seye, "Non-Final Office Action", issued Aug. 18, 2023, U.S. Appl. No. 17/867,131.
Billmers, Meyer A., "Mini-Robot Group User's Guide", MIT, 1974
Examination Report issued in European Application No. 20199191.6 on Jul. 19, 2023.
Examination Report issued in European Application No. 20199147.8 on Sep. 1, 2023.
James W. McKee, A Graphical, Rule Based Robotic Interface System. (Year: 1988).
Lechi Truong, "Final Office Action", issued Sep. 11, 2023, U.S. Appl. No. 17/583,044.
Lechi Truong, "Non-Final Office Action", issued Aug. 3, 2023, U.S. Appl. No. 17/697,871.
Lechi Truong, "Notice of Allowance", issued Sep. 20, 2023, U.S. Appl. No. 17/583,044.
Notice of Allowance issued in U.S. Appl. No. 17/867,238 on Jun. 30, 2023.
"Robotic Process Automation in 1-15 A Virtual Environment Contents", May 1, 2018, https://www.pwc.in/assets/pdfs/publications/2018/robotic-process-automation-in-a-virtual-environment.pdf.
"Run Robot Scripts in Separate 1-15 Sessions", Issue # 61, damies13/rfswarm, GitHub, Jan. 10, 2020, https://github.com/damies13/rfswarm/issues/61.
Extended European Search Report, issued Mar. 25, 2024, European Patent Application No. 20920390.0.
Office Action issued in Taiwanese Application No. 109133854 on May 27, 2024.
U.S. Appl. No. 15/930,906, filed May 13, 2020, Andrew Hall.
U.S. Appl. No. 16/874,593, filed May 14, 2020, Andrew Hall.
U.S. Appl. No. 16/924,910, filed Jul. 9, 2020, Daniel Dines.
U.S. Appl. No. 16/925,544, filed Jul. 10, 2020, Daniel Dines.
U.S. Appl. No. 16/989,003, filed Aug. 10, 2020, Andrew Hall.
U.S. Appl. No. 16/989,064, filed Aug. 10, 2020, Andrew Hall.
"17th Annual Meeting in Shimane Prefectural CIO Forum RPA Technologies Autonomy Introducing RPA that succeeds with the body Why is it easy to deploy horizontally even at a small start?," Nikkei BP Government Technology, Fall 2019 (No. 40), Nikkei BP, pp. 32 and 33 (Oct. 2019).
"About Session 0", Teratail [online], Leverages Co., Ltd., 201 Aug. 6, 2006, [search on Jul. 21, 3rd year of Reiwa], https://teratail.com/questions/6404.
"Connecting to a Console Session with Windows Remote Desktop", Tech TIPS-@IT, [online], ITmedia, Inc., Apr. 10, 2009 [Jul. 21, Reiwa 3], https://www.atmarkit.co.jp/ait/articles/0501/15/news014.html.
"Robotic Desktop Automation in 2021: In-depth Guide," available at https://research.aimultiple.com/rda/ (last accessed Mar. 22, 2021).
"Robotic process automation in a virtual environment," available at https://www.pwc.in/assets/pdfs/publications/2018/robotic-process-automation-in-a-virtual-environment.pdf (last accessed Mar. 22, 2021).
"Run robot scripts in separate 'Sessions'" question page available at https://github.com/damies13/rfswarm/issues/61 (Jan. 10, 2020).
"Special feature RPA maxim 3 Forefront of tools and technology 5 maxims to prevent failure It's not dangerous if you know the rules," Nikkei Computer, Issue No. 979, Nikkei BP, pp. 32 and 33, ISSN 0285-4619 (Dec. 6, 2018).
"Special feature: Production RPA 2 Tool enhancement 3 selection points," Nikkei Computer Data, issue No. 952, Nikkei BP, pp. 30-33, ISSN: 0285-4619 (Nov. 23, 2017).
"Unpacking the Intelligent Technology Powering NEVA (NICE Employee Virtual Attendant," available at https://www.csanalytics.com/wp-content/uploads/2018/10/NICE-Desktop-Automation-Whitepaper-ICS-Analytics.pdf (Oct. 1, 2018).
Abdou K Seye, "Final Office Action", issued Mar. 26, 2021, U.S. Appl. No. 16/924,910.
Abdou K Seye, "Non-Final Office Action", issued Nov. 6, 2020, U.S. Appl. No. 16/924,910.
Abdou K Seye, "Notice of Allowance", issued May 20, 2022, U.S. Appl. No. 16/925,544.
Abdou K Seye, "Notice of Allowance", issued Sep. 15, 2021, U.S. Appl. No. 16/924,910.
AI Multiple Robotic Desktop Automation Guide available at https://blog.aimultiple.com/rda/ (Jan. 1, 2020).
Anagnoste, Sorin, "Robotic Automation Process—The Operating System for the Digital Enterprise", 2018.
Brugali, et al. "Distributed Computing in Robotics and Automation", 2002.
Chacon-Montero, et al. "Towards a Method for Automated Testing in Robotic Process Automation Projects", 2019.
Cristina-Claudia OSMAN, Robotic Process Automation: Lessons Learned from Case Studies. (Year: 2019).
Embedding Remote Desktop ActiveX Control in a Webpage page available at https://docs.microsoft.com/en-us/windows/win32/termserv/embedding-the-remote-desktop-activex-control-in-a-web-page (last accessed Jan. 21, 2022).
European Search Report issued in EP Application No. 20199147 on Mar. 11, 2021.
European Search Report issued in EP Application No. 20199191 on Mar. 12, 2021.
Examination Report issued in EP Application No. 20197271.8 on Mar. 25, 2021.
First Office Action issued in Chinese Application No. 202080002309.8 on Aug. 1, 2022.
Gauthier, et al., "Interprocess Communication for Distributed Robotics", 1987.
Inter-Bot Communication / Delegation Guide available at https://botpress.com/docs/tutorials/interbot (last accessed May 11, 2020).
International Search Report & Written Opinion, issued Apr. 1, 2021, PCT Application No. PCT/US20/63951.
International Search Report & Written Opinion, issued Apr. 8, 2021, PCT Application No. PCT/US20/51940.
International Search Report & Written Opinion, PCT Application No. PCT/US20/63964.
International Search Report and Written Opinion of the International Search Authority issued for PCT Application No. PCT/US2020/063912 on Mar. 18, 2021.

(56) References Cited

OTHER PUBLICATIONS

International Search Report and Written Opinion of the International Search Authority issued for PCT Application No. PCT/US2020/063921 on Mar. 18, 2021.
International Search Report and Written Opinion of the International Search Authority issued in PCT Application No. PCT/US2020/039886 on Nov. 6, 2020.
International Search Report and Written Opinion of the International Search Authority issued in PCT Application No. PCT/US2020/051938 on Mar. 26, 2021.
Jennifer L. Casper, Workflow Study on Human-Robot Interaction in USAR. (Year: 2002).
Kenichi Kawai, "Introduction to OS / 2," First Edition, Baifukan Co., Ltd., pp. 144-152, ISBN: 4-563-01340-4 (Jun. 30, 1988).
Echi Truong, "Non-Final Office Action", issued Apr. 15, 2021, U.S. Appl. No. 16/874,593.
Lechi Truong, "Non-Final Office Action", issued Jun. 24, 2021, U.S. Appl. No. 15/930,906.
Lechi Truong, "Non-Final Office Action", issued Oct. 28, 2021, U.S. Appl. No. 16/989,003.
Echi Truong, "Notice of Allowance", issued Apr. 13, 2020, U.S. Appl. No. 16/793,064.
Lechi Truong, "Notice of Allowance", issued Aug. 2, 2021, U.S. Appl. No. 16/989,064.
Lechi Truong, "Notice of Allowance", issued Jul. 29, 2021, U.S. Appl. No. 16/874,593.
Lechi Truong, "Notice of Allowance", issued Mar. 23, 2022, U.S. Appl. No. 16/989,003.
Lechi Truong, "Notice of Allowance", issued Nov. 26, 2021, U.S. Appl. No. 15/930,906.
Michele Amoretti et al., "Architectural paradigms for robotics applications," Advanced Engineering Informatics, vol. 24, No. 1, pp. 4-13 (Jan. 1, 2010).
Microfocus RPA Architecture page available at https://docs.microfocus.com/itom/Robotic_Process_Automation:2019.07/RPAArch> (last accessed Dec. 30, 2020).
Microsoft Child Sessions documentation page available at https://docs.microsoft.com/en-us/windows/win32/termserv/child-sessions (May 31, 2018).
NICE RPA brochure available at https://www.nice.com/rpa/assets/NICE_Advanced_Process_Automation-Brochure_2018.pdf (last accessed May 11, 2020).
NICE RPA chatbot page available at https://www.nice.com/engage/blog/chatbots--robotic-automation--a-match-made-in-heaven-2315/ (last accessed May 11, 2020).
NICE RPA page available at https://www.nice.com/rpa/robotic-automation/ (last accessed Jun. 15, 2020).
Notice of Allowance issued in Chinese Application No. 202010894023.7 on Jul. 4, 2022.
Notice of Allowance issued in Japanese Patent Application No. 2020-125401 on Aug. 4, 2021.
Notice of Allowance issued in Japanese Application No. 2020-553457 on Oct. 4, 2023.
Abdou K Seye, "Final Office Action", issued Mar. 7, 2024, U.S. Appl. No. 17/867,131.
Amini, Borhan, "Robotic Process Automation Implementation Within an Organization", Bachelor's Thesis, May 2019, Jamk University of Applied Sciences.
EP20920390.0—European Search Report mailed on Mar. 25, 2024, 12 pages.
Lechi Truong, "Notice of Allowance", issued Feb. 7, 2024, U.S. Appl. No. 17/697,871.
Chan, Allen, "The Art of Automation: Chapter 2", published on May 4, 2021; https://www.IBM.com/blog/art-of-automation-chatper-2/, retrieved Aug. 18, 2024 (2021).
Nintex, "A Critical Part of Automating and Optimizing the Modern Workplace", published Mar. 5, 2018; https://nintex.com/blog/rpa-critial-part-automating-orchestrating-optimizing-modern-workplace, retrieved Aug. 19, 2024 (2018).
Shourjo Dasgupta, "Non-Final Office Action", issued Aug. 22, 2024, U.S. Appl. No. 18/157,162.
Thomas, Erica, et al., "Robotic Process Automation (RPA)", published via Procure-to-Pay Training Symposium, Apr. 23, 2019-Apr. 25, 2019, Hilton Lake Buena Vista, Florida, USA, retrieved from https://dodprocurementtoolbox.com/uploads/P2_P_Symposium_Plenary_robotic_Process_Automation_117b446b16c.pdf on Aug. 18, 2024 (2019).
UiPath, "Automation Apps that Require Elevated Access"—Unattended, published Sep. 3, 2021-Oct. 14, 2021; https://forum.uipath.com/t/automation-apps-that-require-elevated-access-unattended/349695, retrieved Aug. 19, 2024.

* cited by examiner

AUTOMATION WINDOWS FOR ROBOTIC PROCESS AUTOMATION USING MULTIPLE DESKTOPS

CROSS-REFERENCE TO RELATED APPLICATION

This application claims the benefit of U.S. Provisional Patent Application Nos. 63/301,679 and 63/301,934, both filed Jan. 21, 2022. The subject matter of these earlier filed applications is hereby incorporated by reference in its entirety.

FIELD

The present invention generally relates to robotic process automation (RPA), and more specifically, to automation windows for RPA using multiple desktops.

BACKGROUND

Attended automation RPA robots (also called "robots" herein) run on a computing system operated by a user. There are multiple ways in which a human and a robot can co-operate a computing system. Shared control is when a person and a robot use the same instance of a desktop, file system mouse/keyboard drivers, etc. This may require the human or the robot to idly stand by from time to time while the other takes full control of the computing system. Alternatively, there are some scenarios where both the human and the robot can work simultaneously, such as when the robot does not need to interact with the user interface.

Various technologies exist that create complete or partial copies of an operating system or the applications running thereon. Emulators have been around for decades and may provide developers. Many of these technologies have been around for decades and may provide users, developers, and administrators with additional flexibility when it comes to interacting with and automating applications. For instance, emulators may provide developers with the ability to test and debug mobile applications that use an operating system that does not support running development tools directly. Both Android® and iOS® offer emulators that can be run from a development machine to test and debug an Android® or iOS® application since the developer tools cannot be natively run on those mobile operating systems.

Simulators allow a developer to host a window on his or her local machine that lets the developer test and debug behavior of an application that are difficult or impossible to perform on a development machine. For example, simulators allow the developer to click a button to rotate the simulator, which tells the application running inside the simulator the device has been rotated for the purposes of testing and debugging application behavior that responds to these events. Another common example is multi-touch. Many developer machines do not support touch, so the simulator lets the developer test and debug how the application responds to multiple touch points. Android® and iOS® emulators also offer simulation capabilities. Furthermore, Microsoft® offers a simulator for their Universal Windows Platform (UWP) applications.

Virtual machines host a second operating system on the machine and can be opened and monitored through a window. This runs a completely different operating system and shares the hardware with the host machine. The "guest" machine must have its own copies of applications installed and does not share common resources or files with the user machine.

Docker® containers are conceptually a hybrid form of virtual machine. All of the applications that need to be executed are packaged into an immutable package that is executed directly on the host operating system. The package is not a complete copy of another operating system, but it does not by default share or have access to any of the applications or resources on the host machine. Thus, from a user experience perspective, Docker® containers feel similar to a virtual machine, but technically, the containers are not executing on a completely separate operating system.

However, conventional emulators, simulators, virtual machines (VMs), and hybrid VMs providing operating system (OS)-level virtualization (e.g., Docker® containers) do not address the issues that arise with attended automation robots operating on the same computing system as the user. Accordingly, an alternative approach may be beneficial.

SUMMARY

Certain embodiments of the present invention may provide alternatives to the problems and needs in the art that have not yet been fully identified, appreciated, or solved by current RPA technologies. For example, some embodiments of the present invention pertain to automation windows for RPA using multiple desktops.

In an embodiment, a computer-implemented method for providing automation windows for RPA using multiple desktops includes launching a user desktop as an active desktop, by a computing system. The computer-implemented method also includes launching an RPA robot desktop, by the computing system. The computer-implemented method further includes executing an RPA workflow by an RPA robot in the RPA robot desktop, by the computing system.

In another embodiment, a non-transitory computer-readable medium stores one or more computer programs providing automation windows for RPA using multiple desktops. The one or more computer programs are configured to cause at least one processor to launch an RPA robot desktop and execute an RPA workflow by an RPA robot in the RPA robot desktop. The RPA robot desktop is launched by a main RPA service. The RPA robot desktop is not the active desktop.

In yet another embodiment, a computing system includes memory storing computer program instructions for providing automation windows for RPA using multiple desktops and at least one processor configured to execute the computer program instructions. The computer program instructions are configured to cause the at least one processor to launch an RPA robot desktop and execute an RPA workflow by an RPA robot in the RPA robot desktop. The computer program instructions are also configured to cause the at least one processor to automatically close the RPA robot desktop after the RPA robot completes execution of the RPA workflow, by the RPA robot or a main RPA service. The RPA robot desktop is not the active desktop.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
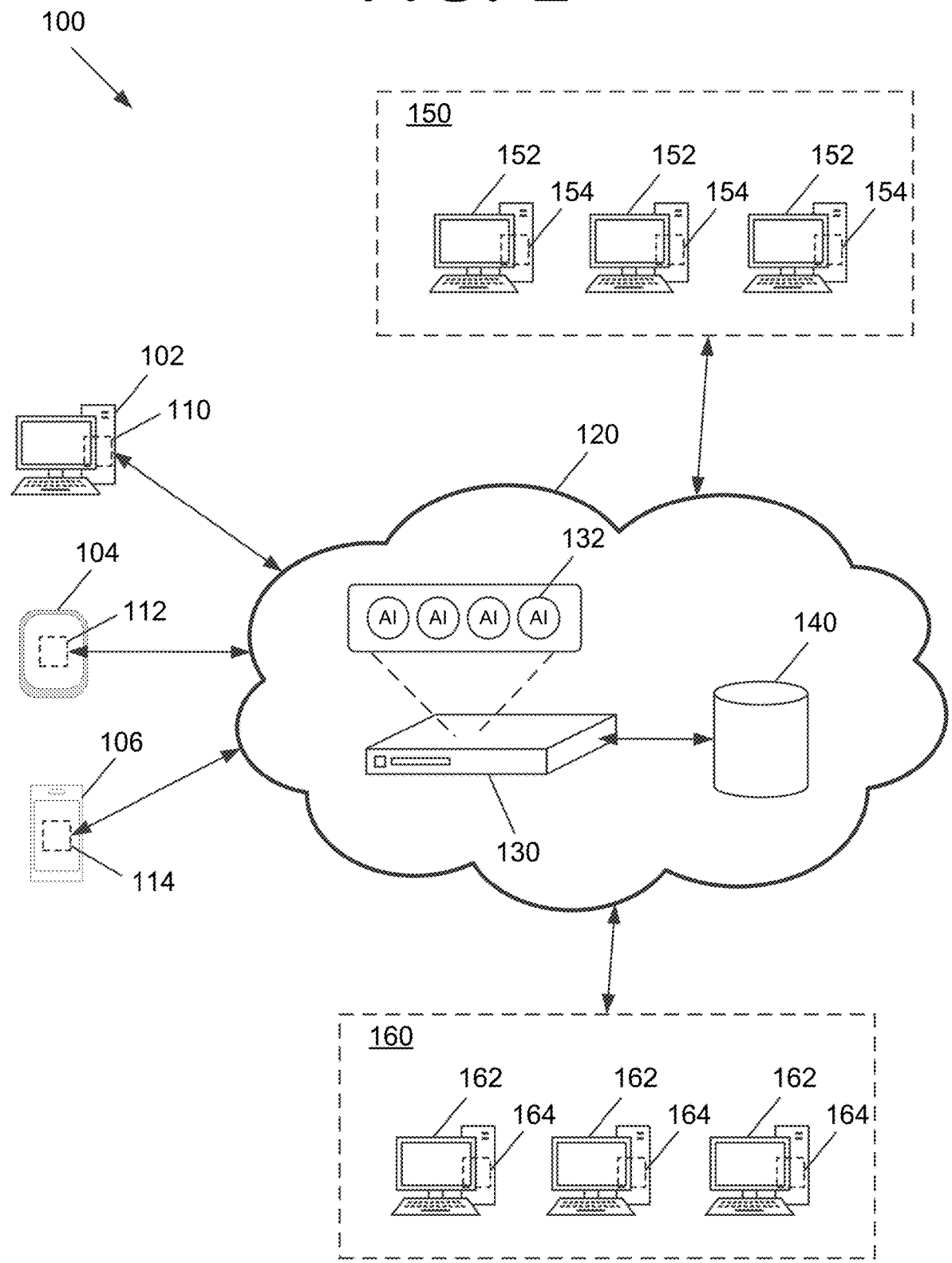
FIG. 1 is an architectural diagram illustrating a hyper-automation system, according to an embodiment of the present invention.

Some embodiments pertain to automation windows for RPA using multiple desktops. In some embodiments, automation windows are used for attended automation. However, in some embodiments, and as discussed below, automation windows may be used for monitoring unattended robots, such as when an operations engineer remotely monitors one or more robots executing on a server, or when a user of the computing system does not need to interact with the robot. Applications for automation windows include, but are not limited to, emulators, simulators, VMs, and hybrid VMs providing OS-level virtualization (e.g., Docker® containers).

In some embodiments, multiple desktops may be employed in a single session (e.g., the user's logon session in Windows®). In the case of Windows®, this may be accomplished by creating the desktops in the window station WinSta0, which runs in the logon session. See, for example, session architecture diagram 700 of FIG. 7. A window station in Windows® is essentially a security boundary (securable object) that is associated with a process, and contains a clipboard, an atom table, and one or more desktop objects. When a window station is created, it is associated with the calling process and assigned to the current session.

With respect to window stations in Windows®, it should be noted that the interactive window station is the only window station that can display a user interface or receive user input. The interactive window station is assigned to the logon session of the user, and contains the keyboard, mouse, and display device. It is always named "WinSta0." All other window stations are noninteractive, which means they cannot display a user interface or receive user input. Thus, only the interactive window station is useful for RPA automations that interact with a user interface.

A desktop in Windows® is a securable object contained within a window station that has a logical display surface and contains user interface objects such as windows, menus, and hooks. The desktop can be used to create and manage windows. Each desktop object is a securable object that, when created, is associated with the current window station of the calling process and assigned to the calling thread. Window messages can be sent only between processes that are on the same desktop. In addition, the hook procedure of a process running on a particular desktop can only receive messages intended for windows created in the same desktop. Thus, any listening for window messages must occur on that desktop.

The desktops associated with the interactive window station (Winsta0) can be made to display a user interface and receive user input, but only one of these desktops at a time is active. This active desktop, also known as the input desktop, is the one that is currently visible to the user and that receives user input when the user clicks a mouse or types on a keyboard. Applications can use the OpenInputDesktop function to get a handle to the input desktop. Applications that have the required access can use the SwitchDesktop function to specify a different input desktop.

The "default" desktop is created when Winlogon starts the initial process as the logged-on user. At that point, the Default desktop becomes active, and it is used to interact with the user. The Winlogon desktop is active while a user logs on. The system switches to the default desktop when the shell indicates that it is ready to display something, or after thirty seconds, whichever comes first. During the user's session, the system switches to the Winlogon desktop when the user presses the CTRL+ALT+DEL key sequence, or when the User Account Control (UAC) dialog box is open. Only one desktop can be active at a time. Programs or windows that otherwise may be distracting to the user could be opened in another desktop and window messages could be sent to operate that window.

RPA robots may be executed to interact with applications running in a different desktop than the one the user is using. However, where robot interactions with graphical interfaces of applications occur that require calling certain simulated hardware inputs that can only be run in the active desktop due to operating system rules, the RPA robot in some embodiments switches the desktop with that interface to the active desktop and then performs its actions using simulated hardware inputs (e.g., key presses, mouse clicks, mouse movements, etc.). During this time, the user is not able to use the keyboard and mouse without conflicting with the robot's operations. Another potential issue is that only the logon session is used, and thus the interactive window station and its desktops make use of the same set of processes and other system objects that represent a single user's logon session.

In some embodiments, a main robot service running in the main session is able to launch robot desktops using operating system APIs (e.g., those for Windows®) and cause RPA robots to execute therein. A bridge process enables the main robot service to communicate with the RPA robots in the robot desktops (e.g., via custom inter-process communication (IPC) functionality). In other words, via the bridge process, the desktop RPA robot(s) can communicate with the main RPA process in the user's active desktop.

IPC protocols may facilitate communication via the network, pipes, Component Object Model (COM), Remote Procedure Calls (RPC), sockets, etc. Suitable session creation mechanisms and IPC protocols may be used for other operating systems as well, where supported. IPC enables RPA robots operating in robot desktops to communicate with an RPA main service using the bridge process. The robot(s) and main RPA service may send status notifications, commands, requests, and information via the IPC protocol.

For RPA workflow activities that can be performed in the robot desktop without the desktop being the active desktop, the RPA robot carries out these activities without interfering with the user. For instance, the Windows® APIs that get the foreground window and build the window tree do not require the robot desktop to be the active desktop. This is the case with many other APIs as well. However, if the activity requires the robot desktop to be the active desktop, the RPA robot or the main RPA process can set the robot desktop as the active desktop and carry out these activities. The RPA robot or the main RPA process may then switch the user's desktop back to being the active desktop.

Certain embodiments may be employed for robotic process automation (RPA). FIG. 1 is an architectural diagram illustrating a hyper-automation system 100, according to an embodiment of the present invention. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with artificial intelligence (AI)/machine learning (ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

Each user computing system 102, 104, 106 has respective automation process(es) 110, 112, 114 running thereon. Automation process(es) 102, 104, 106 may include, but are not limited to, RPA robots, part of an operating system, downloadable application(s) for the respective computing system, any other suitable software and/or hardware, or any combination of these without deviating from the scope of the invention. In some embodiments, one or more of process(es) 110, 112, 114 may be listeners. Listeners may be RPA robots, part of an operating system, a downloadable application for the respective computing system, or any other software and/or hardware without deviating from the scope of the invention. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See, for example, U.S. Pat. No. 10,860,905. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing Application Programming Interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and/or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process(es) 110, 112, 114 may call one or more AI/ML models 132 deployed on or accessible by core hyper-automation system 120. AI/ML models 132 may be trained for any suitable purpose without deviating from the scope of the invention, as will be discussed in more detail later herein. Two or more of AWL models 132 may be chained in some embodiments (e.g., in series, in parallel, or a combination thereof) such that they collectively provide collaborative output(s). AI/ML models 132 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMIs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., Extensible Application Markup Language (XAML) process data) may be exported to process documents or to a designer application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Web™). For instance, RPA developers of an RPA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via Drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance to the automation process development pipeline in some embodiments by preventing developers from taking dependencies on unapproved software libraries that may either introduce security risks or work in a way that violates policies, regulations, privacy laws, and/or privacy policies. See, for example, U.S. Nonprovisional patent application Ser. No. 16/924,499 (published as U.S. Patent Application Publication No. 2022/0011732), which is hereby incorporated by reference in its entirety.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, and/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
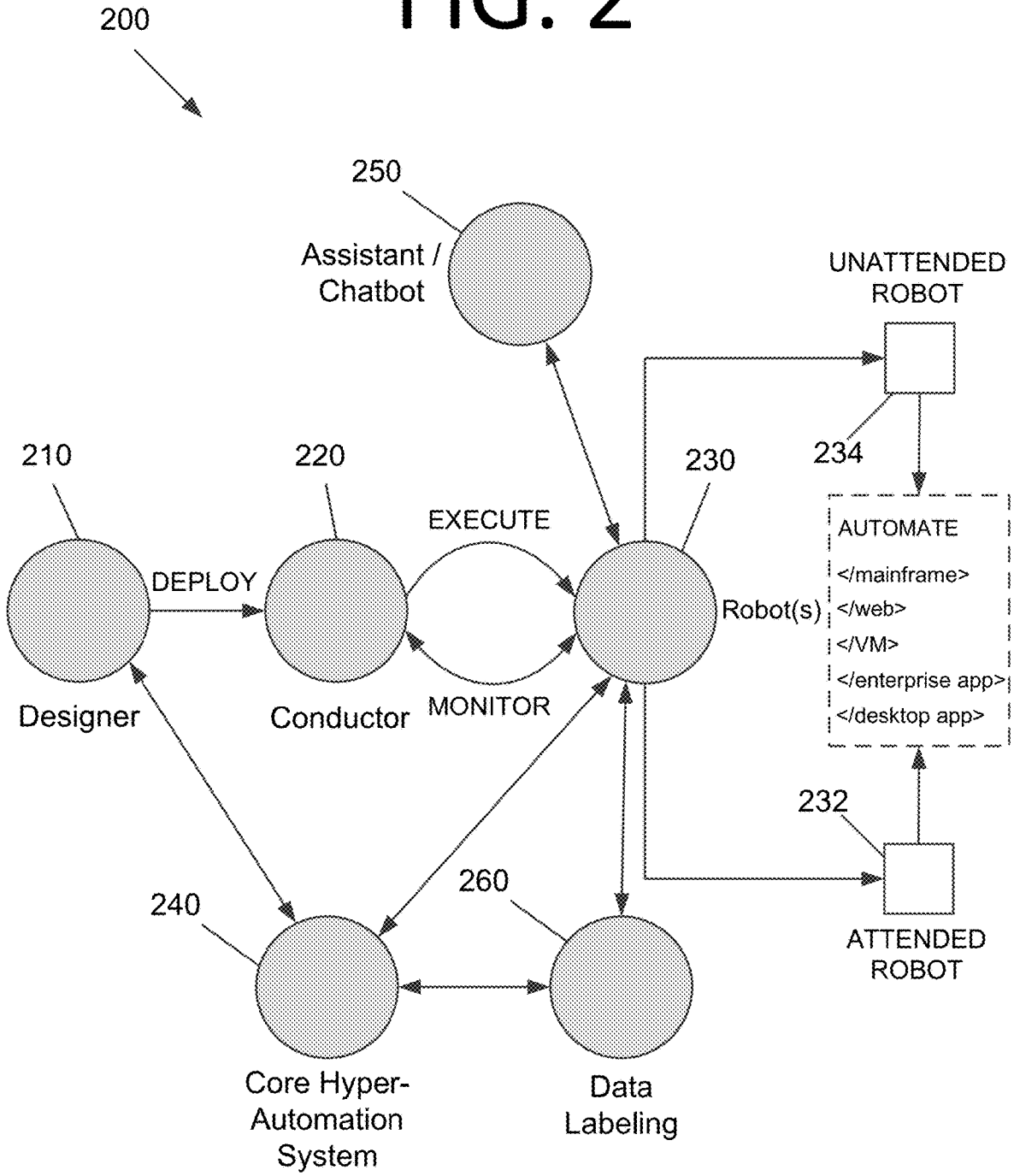
FIG. 2 is an architectural diagram illustrating an RPA system, according to an embodiment of the present invention.

FIG. 2 is an architectural diagram illustrating an RPA system 200, according to an embodiment of the present invention. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) database or a "not only SQL" (NoSQL) database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyper-automation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
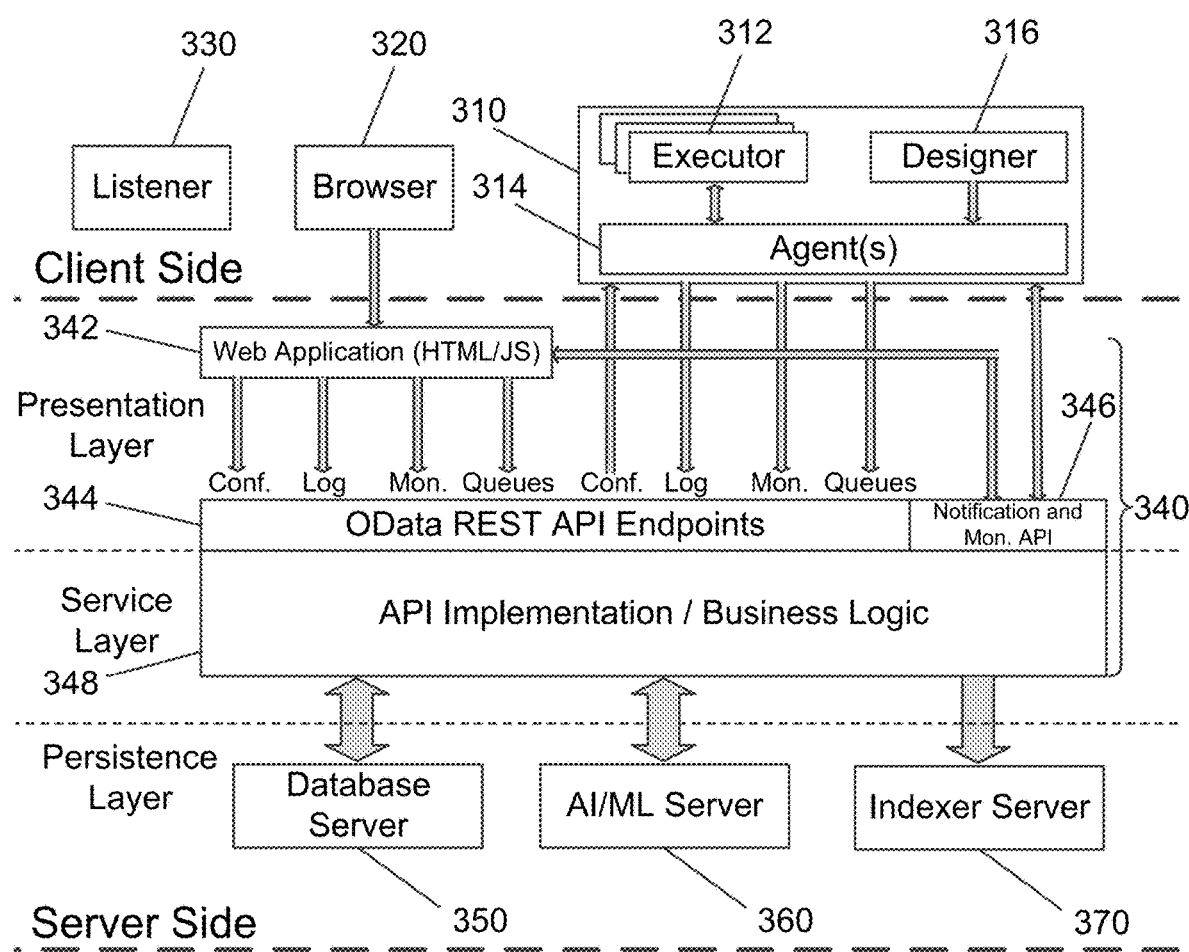
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 350, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 330 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 342, Open Data Protocol (OData) Representative State Transfer (REST) Application Programming Interface (API) endpoints 344, and notification and monitoring 346), a service layer (API implementation/business logic 348), and a persistence layer (database server 350, AI/ML server 360, and indexer server 370) are included. Conductor 340 includes web application 342, OData REST API endpoints 344, notification and monitoring 346, and API implementation/business logic 348. In some embodiments, most actions that a user performs in the interface of conductor 340 (e.g., via browser 320) are performed by calling various APIs. Such actions may include, but are not limited to, starting jobs on robots, adding/removing data in queues, scheduling jobs to run unattended, etc. without deviating from the scope of the invention. Web application 342 is the visual layer of the server platform. In this embodiment, web application 342 uses Hypertext Markup Language (HTML) and JavaScript (JS). However, any desired markup languages, script languages, or any other formats may be used without deviating from the scope of the invention. The user interacts with web pages from web application 342 via browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer that exposes OData REST API endpoints 344. However, other endpoints may be included without deviating from the scope of the invention. The REST API is consumed by both web application 342 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments.

The APIs in the service layer may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer includes a trio of servers in this embodiment—database server 350 (e.g., a SQL server), AI/ML server 360 (e.g., a server providing AI/ML model serving services, such as AI center functionality) and indexer server 370. Database server 350 in this embodiment stores the configurations of the robots, robot groups, associated processes, users, roles, schedules, etc. This information is managed through web application 342 in some embodiments. Database server 350 may manage queues and queue items. In some embodiments, database server 350 may store messages logged by the robots (in addition to or in lieu of indexer server 370). Database server 350 may also store process mining, task mining, and/or task capture-related data, received from listener 330 installed on the client side, for example. While no arrow is shown between listener 330 and database 350, it should be understood that listener 330 is able to communicate with database 350, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 350.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 360 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint(s) to indexer server 370, where they are indexed for future utilization.

Figure 4:
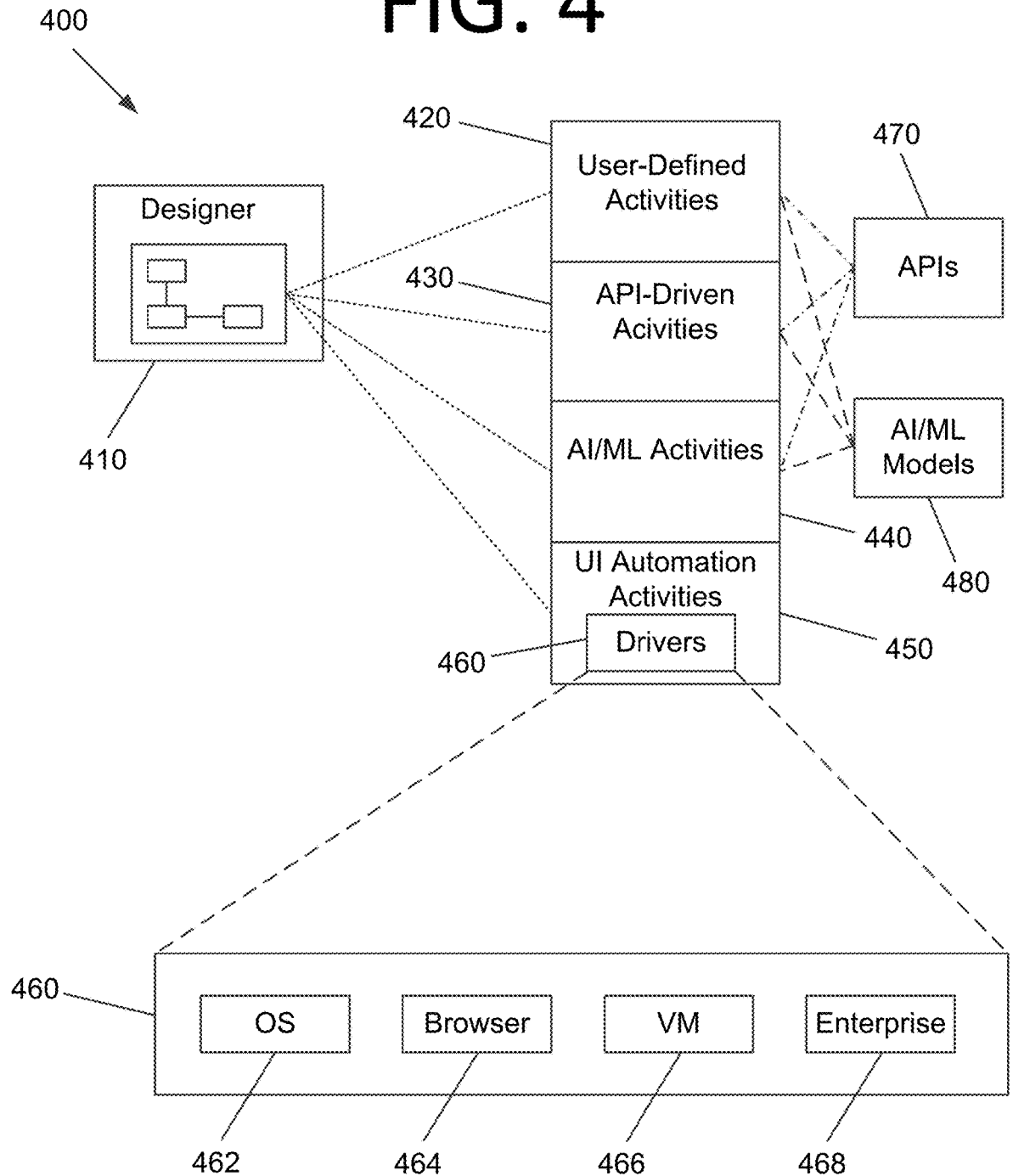
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, 440, 450, drivers 460, APIs 470, and AI/ML models 480, according to an embodiment of the present invention. Per the above, a developer uses designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or and UI automation activities 450. User-defined activities 420 and API-driven activities 440 interact with applications via their APIs. User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the invention.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, Citrix SAP®, etc. For instance, the "click" activity performs the same role in these different applications via drivers 460.

Figure 5:
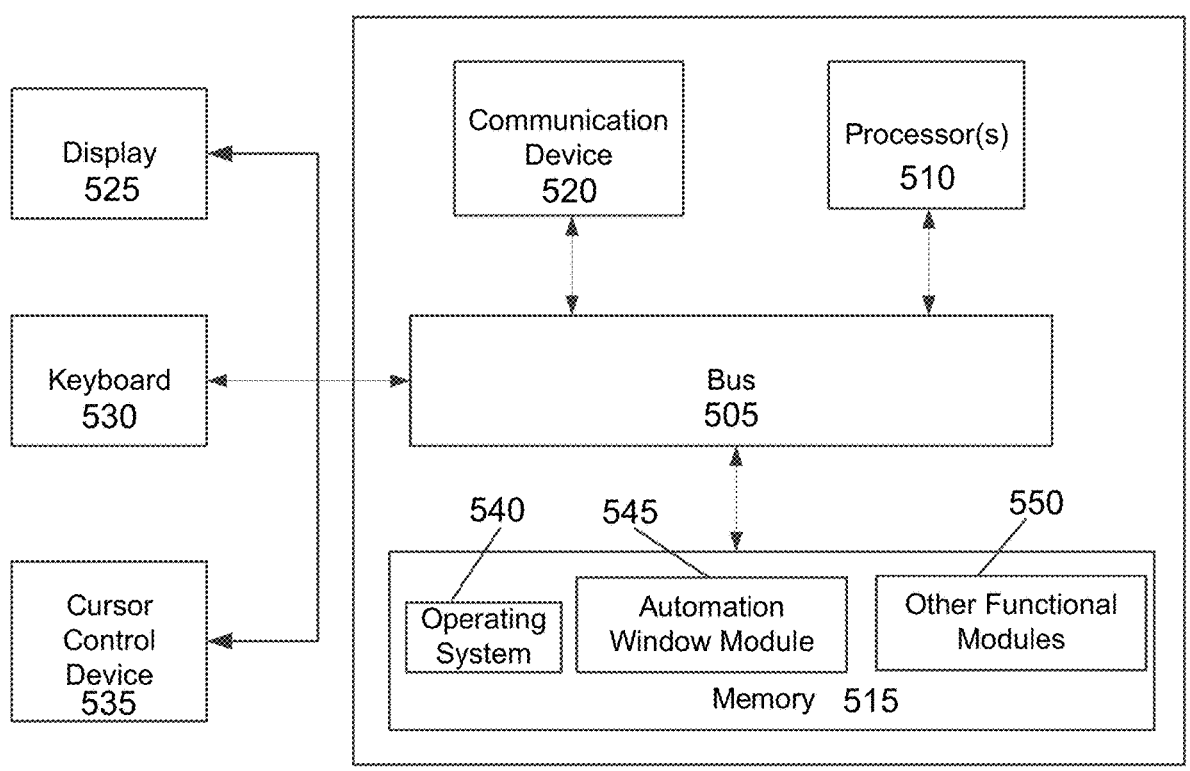
FIG. 5 is an architectural diagram illustrating a computing system configured to provide automation windows for RPA using multiple desktops, according to an embodiment of the present invention.

FIG. 5 is an architectural diagram illustrating a computing system 500 configured to provide automation windows for RPA using multiple desktops, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automation window module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Per the above, in attended automation, a robot works alongside a user on the same computing system. Robots in RPA often interact with the computing system in a similar manner to the user (e.g., generating mouse click and key press events, simulating these events via APIs (e.g., using window messages), etc.). However, many activities performed by RPA robots do not require the user's desktop or taking control from the user. Accordingly, some embodiments create a second desktop to host and run automations therein. The user may monitor what the robot is doing through the second (robot) desktop. If an activity requires simulating user actions or input from the user is desired, the RPA robot may accomplish such interactions with the user via the bridge process and the main RPA service. In some embodiments, the robot desktops may be running on a remote machine that is controlled by the user's computing system.

In certain embodiments, the RPA robot may be running on a user's computing system and driving a remote computing system through the remote runtime (e.g., via UiPath Remote Runtime™). UiPath Remote Runtime™ is a component that facilitates the communication between a remote application or desktop, such as Citrix Virtual Apps and Desktops™, and the dedicated UiPath® extension (e.g., the UiPath® extension for Citrix® or the UiPath® extension for Windows® Remote Desktop). UiPath Remote Runtime™ gathers information pertaining to targeted UI elements of remote applications and sends this information to the corresponding extension so that selectors are natively generated in UI Explorer™.

Figure 6:
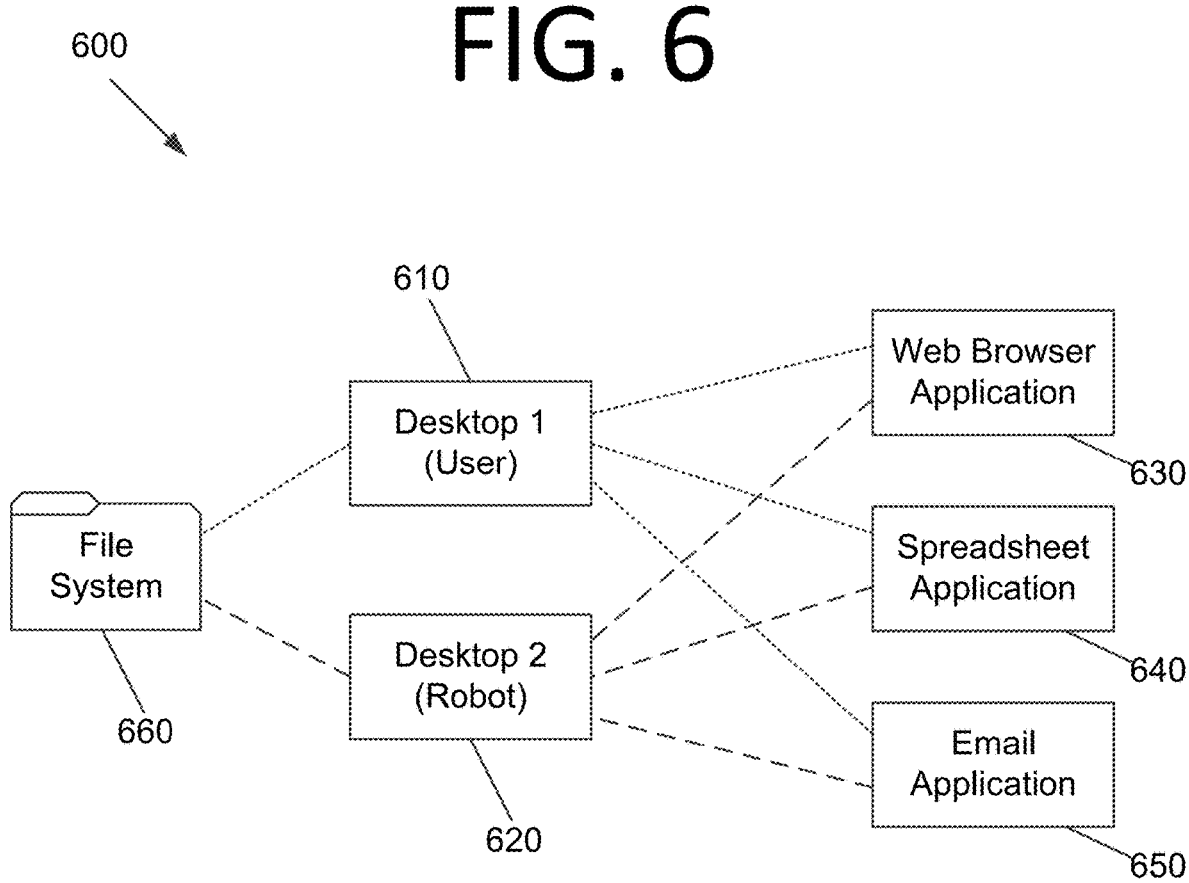
FIG. 6 illustrates some applications of a user computing system running user and robot desktops with some applications running therein, according to an embodiment of the present invention.

As stated previously, the user and the robot are both interacting with the same application instances and file system in some embodiments. FIG. 6 illustrates some applications of a user computing system 600 running a user desktop 610 and a robot desktop 620 with some applications running therein, according to an embodiment of the present invention. As can be seen in FIG. 6, web browser application 630, spreadsheet application 640, and email application 650 are accessible by both user desktop 610 and robot desktop 620, whichever is currently active.

Figure 7:
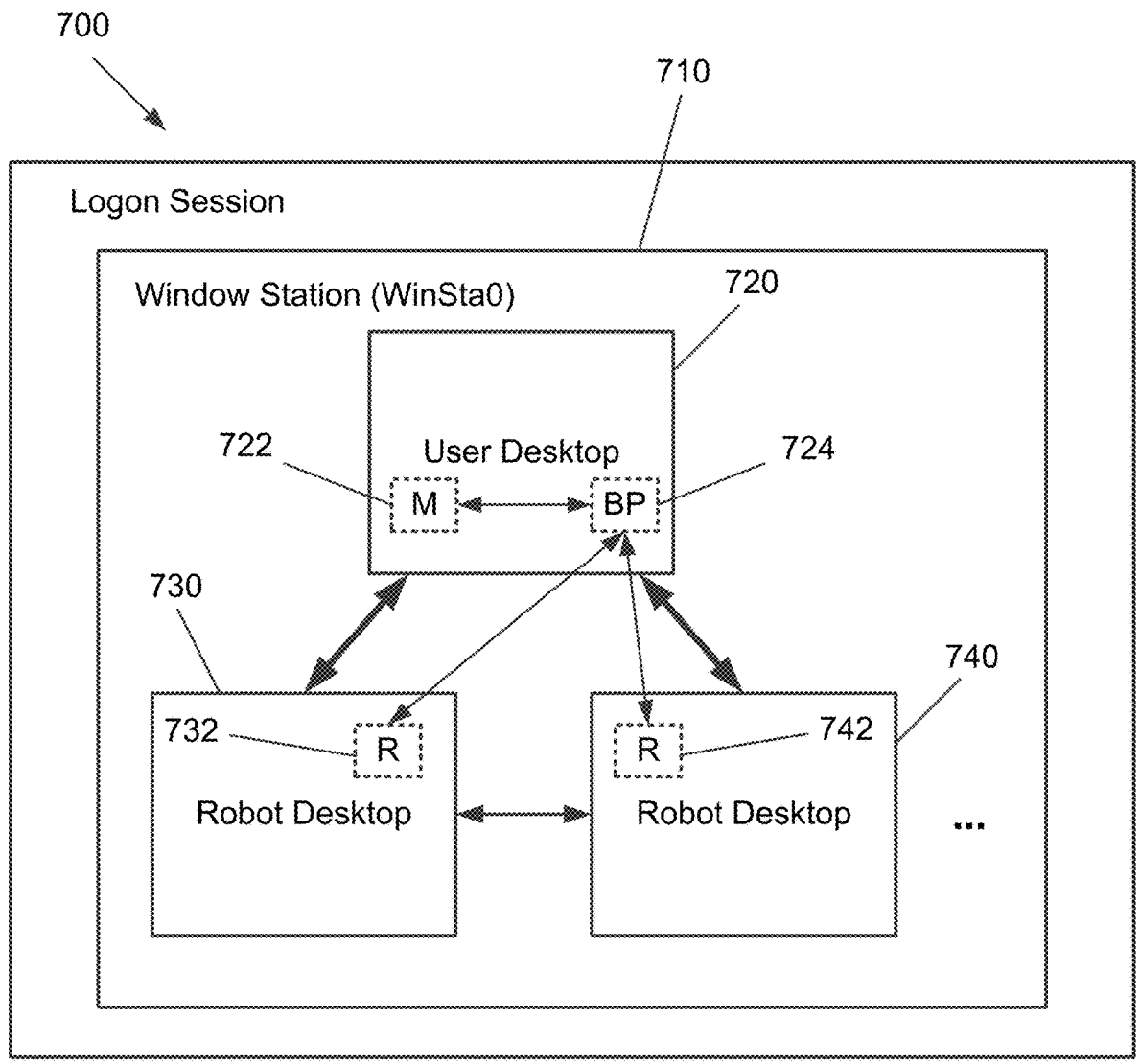
FIG. 7 is an architectural diagram illustrating a Windows® logon session, according to an embodiment of the present invention.

FIG. 7 is an architectural diagram illustrating a Windows® logon session 700, according to an embodiment of the present invention. Logon session 700 includes interactive window station (WinSta0) 710, which is the interactive window station. Other non-interactive window stations may be included without deviating from the scope of the invention, and unattended RPA robots may run therein in some embodiments. WinSta0 includes user desktop 720 (e.g., the default desktop), robot desktops 730, 740, and potentially others. User desktop, which is initially the active desktop, also includes a main RPA service 722 and a bridge process 724. As permitted by Windows®, it is possible to set another desktop as the active desktop, thus "switching" between active desktops, as indicated by the thick black arrows between desktops 720, 730, 740. The thin black arrows denote communications via IPC.

RPA robots 732, 742 operate in robot desktops 730 and 740, respectively, and can perform various activities therein without robot desktops 730, 740 being the active desktop, such as launching applications, calling application APIs, and performing other activities that do not require robot desktops 730, 740 to be the active desktop. In some embodiments, RPA robots 732, 742 are launched by main RPA service 722. If robot 732 or 742 needs to have its respective desktop 730 or 740 be the active desktop to carry out an activity in the respective RPA workflow for the robot, robot 732 or 742 may call an operating system API to set desktop 730 or 740 as the active desktop. Alternatively, robot 730 or 740 may communicate with main RPA service 722 via bridge process 724 using IPC to request the active desktop change.

Main RPA process 722 may make the API call to switch the active desktop or may prompt the user regarding whether the switch is currently desired. If the user does not desire the active desktop switch to occur immediately, the user may wait until he or she is ready and then confirm the switch. Main RPA process 722 may then set respective robot desktop 730 or 740 to the active desktop or instruct robot 732 or 742 to do so. RPA robot 732 or 742 is then able to call APIs requiring the active desktop in respective robot desktop 730 pr 740. During this time, the user is not able to use the keyboard and mouse without conflicting with the operations of robot 732 or 742.

Figure 8:
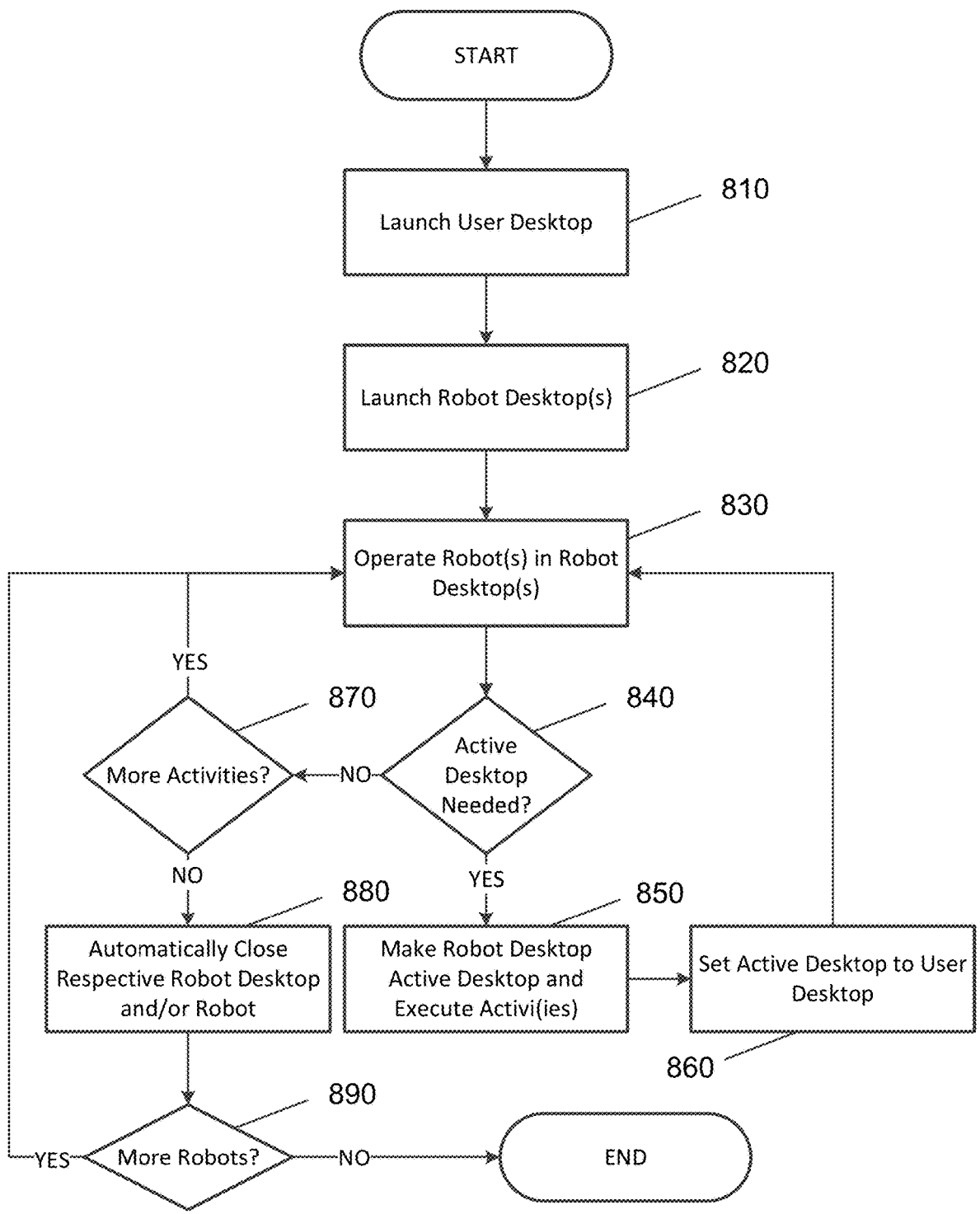
FIG. 8 is a flowchart illustrating a process for providing automation windows for RPA using multiple desktops, according to an embodiment of the present invention.

FIG. 8 is a flowchart illustrating a process 800 for providing automation windows for RPA using multiple desktops, according to an embodiment of the present invention. The process begins with launching a user desktop at 810. In some embodiments, this may be the default desktop of the operating system (e.g., the default desktop of the logon session of Windows®). One or more robot desktops are then launched at 820. The robot desktops may also include windows, menus, and hooks, if permitted by the operating system. The robot(s) then operate in their respective robot desktops at 830. In some embodiments, the robots are launched by a main RPA service. The robot desktop(s) may include user interface(s) for application(s) that the robot(s) open and interact with when performing their respective automation.

If a robot needs its robot desktop to be the active desktop to execute one or more activities in its workflow at 840, the robot or a main RPA service in the user desktop (after being informed that the switch is needed by the RPA robot via a bridge process) makes the robot desktop the active desktop (e.g., using SwitchDesktop in Windows®), and the RPA robot executes these workflow activities in the robot desktop. When these activities are complete, the robot or the main RPA service then sets the user desktop as the active desktop at 860, and the process returns to step 830. In some embodiments, if more than one RPA robot needs its robot desktop to be the active desktop at the same time, one robot may wait for the other RPA robot to complete its activities before setting its desktop as the active desktop (or the main RPA service doing so). In such embodiments, the active desktop may be switched from one robot desktop to another robot desktop rather than setting the active desktop back to the user desktop.

When the RPA robot(s) do not need the active desktop at 840, if the robot(s) have more activities in their workflow(s) at 870, the process returns to step 830. However, if at least one RPA robot does not have more activities in its RPA workflow at 870, the main RPA service or the robot(s) automatically close their respective robot desktop(s) at 880, and possibly terminate the robot process. In some embodiments, this may be performed as one or more activities in the robot workflow(s). If no more robots are executing at 890, the process ends.

The process steps performed in FIG. 8 may be performed by a computer program, encoding instructions for the processor(s) to perform at least part of the process(es) described in FIG. 8, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for providing automation windows for robotic process automation (RPA) using multiple desktops, comprising:
launching a user desktop as an active desktop, by a computing system;
launching an RPA robot desktop, by the computing system;
executing an RPA workflow by an RPA robot in the RPA robot desktop, by the computing system;
responsive to the RPA robot reaching one or more activities in the RPA workflow that require the RPA robot desktop to be the active desktop, switching the active desktop to the RPA robot desktop, by a main RPA process; and
responsive to the RPA robot completing execution of the one or more activities in the RPA workflow that require the RPA robot desktop to be the active desktop, switching the user desktop to the RPA robot desktop, by the main RPA process.

2. The computer-implemented method of claim 1, wherein the RPA robot desktop is launched by a main RPA service.

3. The computer-implemented method of claim 1, wherein when the RPA robot reaches the one or more activities in the RPA workflow that require the RPA robot desktop to be the active desktop, the method further comprises:
sending a request to a main RPA service to switch the RPA robot desktop to the active desktop via a bridge process, by the RPA robot; and
performing the switching, wherein
the request from the RPA robot to the main RPA service is sent via the bridge process using inter-process communication (IPC).

4. The computer-implemented method of claim 3, wherein when the RPA robot completes execution of the one or more activities in the RPA workflow that require the RPA robot desktop to be the active desktop, the method further comprises:
sending a request to the main RPA service to switch the user desktop to the active desktop via the bridge process, by the RPA robot.

5. The computer-implemented method of claim 1, further comprising:
launching another RPA robot desktop, by the computing system; and
executing another RPA workflow by another RPA robot in the other RPA robot desktop, by the computing system.

6. The computer-implemented method of claim 5, wherein when both the RPA robot and the other RPA robot require their respective RPA desktop to be the active desktop to execute one or more activities in their respective RPA workflows, the method further comprises:
waiting for the RPA robot to complete execution of the one or more activities requiring the RPA robot desktop to be the active desktop, by the other RPA robot;
after the RPA robot completes execution of the one or more activities requiring the RPA robot desktop to be the active desktop, switching the active desktop to the other RPA robot desktop, by the other RPA robot or by a main RPA service; and
executing the one or more activities requiring the other RPA robot desktop to be the active desktop, by the other RPA robot.

7. The computer-implemented method of claim 1, further comprising:
automatically closing the RPA robot desktop, by the RPA robot or a main RPA service.

8. A non-transitory computer-readable medium storing one or more computer programs providing automation windows for robotic process automation (RPA) using multiple desktops, wherein the one or more computer programs are configured to cause at least one processor to:
launch an RPA robot desktop;
execute an RPA workflow by an RPA robot in the RPA robot desktop;
responsive to the RPA robot reaching one or more activities in the RPA workflow that require the RPA robot desktop to be the active desktop, switch the active desktop to the RPA robot desktop; and
responsive to the RPA robot completing execution of the one or more activities in the RPA workflow that require the RPA robot desktop to be the active desktop, switch the user desktop to the RPA robot desktop, wherein
the RPA robot desktop is launched by a main RPA service.

9. The non-transitory computer-readable medium of claim 8, wherein when the RPA robot reaches the one or more activities in the RPA workflow that require the RPA robot desktop to be the active desktop, the one or more computer programs are further configured to cause the at least one processor to:
send a request to the main RPA service to switch the RPA robot desktop to the active desktop via a bridge process, by the RPA robot; and
perform the switch to the active desktop, wherein
the request from the RPA robot to the main RPA service is sent via the bridge process using inter-process communication (IPC).

10. The non-transitory computer-readable medium of claim 9, wherein when the RPA robot completes execution of the one or more activities in the RPA workflow that require the RPA robot desktop to be the active desktop, the one or more computer programs are further configured to cause the at least one processor to:

send a request to the main RPA service to switch the user desktop to the active desktop via the bridge process, by the RPA robot.

11. The non-transitory computer-readable medium of claim 8, wherein the one or more computer programs are further configured to cause the at least one processor to:

launch another RPA robot desktop; and execute another RPA workflow by another RPA robot in the other RPA robot desktop.

12. The non-transitory computer-readable medium of claim 8, wherein the one or more computer programs are further configured to cause the at least one processor to:

automatically close the RPA robot desktop, by the RPA robot or a main RPA service.

13. A computing system, comprising:

memory storing computer program instructions for providing automation windows for robotic process automation (RPA) using multiple desktops; and at least one processor configured to execute the computer program instructions, wherein the computer program instructions are configured to cause the at least one processor to:

launch an RPA robot desktop;

execute an RPA workflow by an RPA robot in the RPA robot desktop, and responsive to the RPA robot reaching one or more activities in the RPA workflow that require the RPA robot desktop to be the active desktop, switch the active desktop to the RPA robot desktop, and responsive to the RPA robot completing execution of the one or more activities in the RPA workflow that require the RPA robot desktop to be the active desktop, switch the user desktop to the RPA robot desktop.

14. The computing system of claim 13, wherein when the RPA robot reaches the one or more activities in the RPA workflow that require the RPA robot desktop to be the active desktop, the computer program instructions are further configured to cause the at least one processor to:

send a request to the main RPA service to switch the RPA robot desktop to the active desktop via a bridge process, by the RPA robot; and perform the switching, wherein the request from the RPA robot to the main RPA service is sent via the bridge process using inter-process communication (IPC).

15. The computing system of claim 14, wherein when the RPA robot completes execution of the one or more activities in the RPA workflow that require the RPA robot desktop to be the active desktop, the computer program instructions are further configured to cause the at least one processor to:

send a request to the main RPA service to switch the user desktop to the active desktop via the bridge process, by the RPA robot.

16. The computing system of claim 13, wherein the computer program instructions are further configured to cause the at least one processor to:

launch another RPA robot desktop; and execute another RPA workflow by another RPA robot in the other RPA robot desktop.

\* \* \* \* \*